May 14, 1963 A. E. BRENNEMANN ET AL 3,090,023

SUPERCONDUCTOR CIRCUIT

Filed June 30, 1959 5 Sheets-Sheet 1

INVENTORS
ANDREW E. BRENNEMANN
ROBERT T. TSUI

BY John E. Dougherty Jr.
ATTORNEY

May 14, 1963 A. E. BRENNEMANN ETAL 3,090,023

SUPERCONDUCTOR CIRCUIT

Filed June 30, 1959 5 Sheets-Sheet 2

May 14, 1963 A. E. BRENNEMANN ETAL 3,090,023
SUPERCONDUCTOR CIRCUIT
Filed June 30, 1959 5 Sheets-Sheet 3
FIG. 7
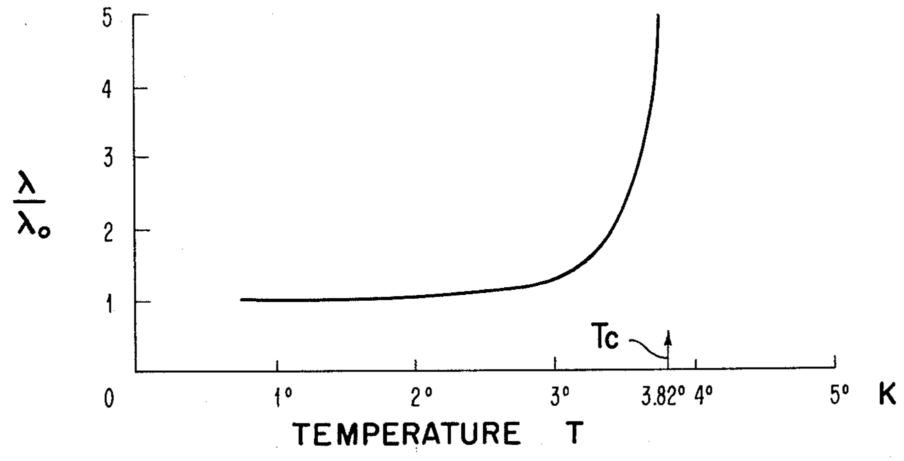
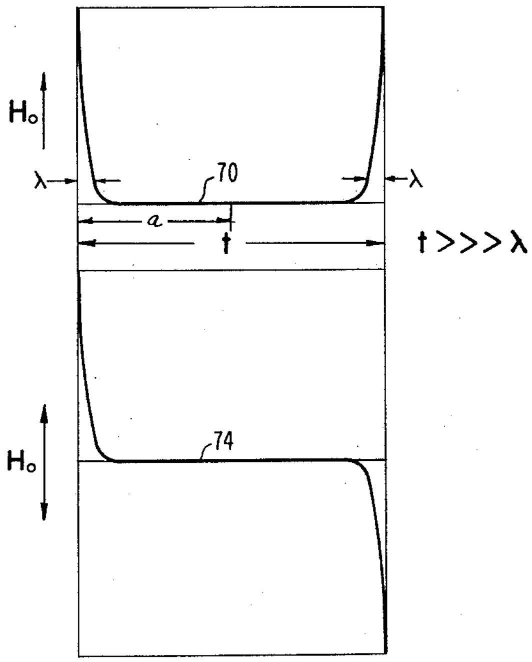
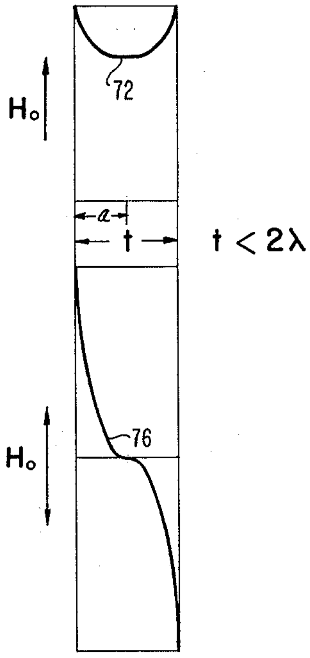
FIG. 5
FIG. 6

United States Patent Office 3,090,023
Patented May 14, 1963

3,090,023
SUPERCONDUCTOR CIRCUIT
Andrew E. Brennemann and Robert T. Tsui, Poughkeepsie, N.Y., assignors to International Business Machines Corporation, New York, N.Y., a corporation of New York
Filed June 30, 1959, Ser. No. 824,016
21 Claims. (Cl. 338—32)

The present invention relates to superconductor circuits and devices, and more particularly, to thin film superconductor gating devices.

The basic modulating device which has been used in superconductor circuits consists of a gate conductor of superconductor material which is maintained slightly below the critical transition temperature of such material and controlled between superconductive and resistive states by signals applied to a control conductor arranged in magnetic field applying relationship therewith. Originally, such devices were fabricated of what is termed bulk superconductor material. It is a characteristic of the superconductive state that a magnetic field applied to a superconductor material penetrates the material only slightly. The depth to which such an applied field penetrates the superconductor varies according to the material itself and the operating temperature. The term penetration depth is usually used to indicate the depth of penetration of an applied field. By the term bulk material, as used above, it is meant that the thickness of the conductors forming the device is very large compared to the penetration depth of the superconductor material. Devices of this type have certain advantages in that they are not subject to changes in their operating characteristics when the penetration depth of the material of which they are fabricated is changed by a change in the temperature of the devices. For this reason, such devices have been advantageously operated as close as possible to the transition temperature of the gate material. For example, wire wound cryotrons, which are bulk devices, are conventionally fabricated of tantalum wire gates and niobium control coils and operated at a temperature of 4.2° K. which is only slightly below the critical transition temperature of 4.4° K. for tantalum.

More recently, superconductor gating devices have been fabricated of thin films of superconductor material. The films may be laid down on a cylindrical or planar substrate with the latter type construction being preferable since it renders it possible to more easily fabricate, on a mass scale, circuits including large numbers of gating devices. Thin film gating devices, besides having advantages because of their adaptability to large scale production, exhibit very high electrical resistance when in a normal state, and, therefore, render it possible to operate superconductor circuits at higher speeds than is possible with their bulk counterparts. Thin film circuits of this type may be fabricated with any one or more of a number of superconductor materials, but because tin and lead are readily adaptable to vacuum metalization techniques, thin film devices have, in the most part, been fabricated of tin gate conductors and lead control conductors. For this reason, tin-lead thin film gating devices are herein disclosed as the preferred embodiments of the subject invention, it being understood, however, that the principles of the invention are broadly applicable and are not limited to the devices fabricated of these two materials.

Upon to now it has been the practice to operate thin film cryotrons in a manner similar to bulk cryotrons, that is, as close as possible to the transition temperature for the gate conductor. Thus, cryotrons having tin gates exhibiting critical transition temperatures in the vicinity of 3.8° K. have been operated just slightly below their transition temperatures. The operating temperatures for such devices have usually been higher than 95% of the critical transition temperature for the gate and such devices have not been operated at temperatures below 94% of the critical transition temperature for the gate. However, difficulties have been encountered in fabricating such devices to exhibit gain. It has been necessary, for example, in fabricating planar thin film cryotrons, to make the width of the gate conductor many times greater than that of the control conductor to achieve gain greater than unity at the normal operating temperatures close to the critical transition temperature of the gate material.

What has been discovered is that the gain of thin film cryotrons, that is, cryotrons having gate conductors whose thickness is relatively of the same order of magnitude as the penetration depth for the gate material in the vicinity of the critical transition temperature for the gate, is extremely temperature sensitive in the region of the gate's critical transition temperature. More specifically, it has been found that the gain of such devices is a function of the ratio of the thickness of the gate to its penetration depth at the operating temperature.

The penetration depth for any superconductor material is a function of the operating temperature and increases as the operating temperature increases. The rate of change in penetration depth with changes in temperature is greatest at temperatures near the critical transition temperature and decreases as the temperature is lowered from the critical transition temperature. As a result, the gain of thin film cryotrons can be enhanced appreciably by operating the devices at temperatures substantially removed from the critical transition temperature. Further, by operating at these lower temperatures, not only is high gain achieved, but also the gain is much less sensitive to small changes in temperature than has been the case at the higher operating temperatures in excess of 94% of the transition temperature of the gate which have been heretofore employed.

A principal object of the present invention is to provide improved thin film superconductor gating devices, and more specifically, superconductor gating devices which exhibit improved gain characteristics.

Another object is to provide thin film cryotron type devices operated at a superconductive temperature at which the devices exhibit high gain.

Still another object is to provide thin film cryotron type devices operated at a superconductive temperature at which the devices have a gain characteristic which is relatively insensitive to temperature changes.

A more specific object of the present invention is to provide thin film cryotron devices of the type fabricated by laying down a wide gate conductor and a narrow control conductor on a planar substrate with the control conductor traversing the gate conductor, wherein the devices are operated at a temperature at which the gain is relatively high and is relatively insensitive to small temperature changes.

It is still another object to provide superconductor thin film gating devices operated at temperatures less than 94% of the critical transition temperature for their gates whereby the devices exhibit improved gain characteristics.

The foregoing and other objects, features and advantages of the invention will be apparent from the following more particular description of preferred embodiments of the invention, as illustrated in the accompanying drawings.

In the drawings:

FIG. 5 is a schematic representation of the field distribution within a bulk superconductive conductor both for externally applied fields and for fields produced by current in the conductor itself.

FIG. 6 is a schematic representation of the field distribution within a thin film superconductive conductor both for externally applied fields and for fields produced by current in the conductor itself.

FIG. 7 is a plot of penetration depth versus temperature for tin.

Figure 1:
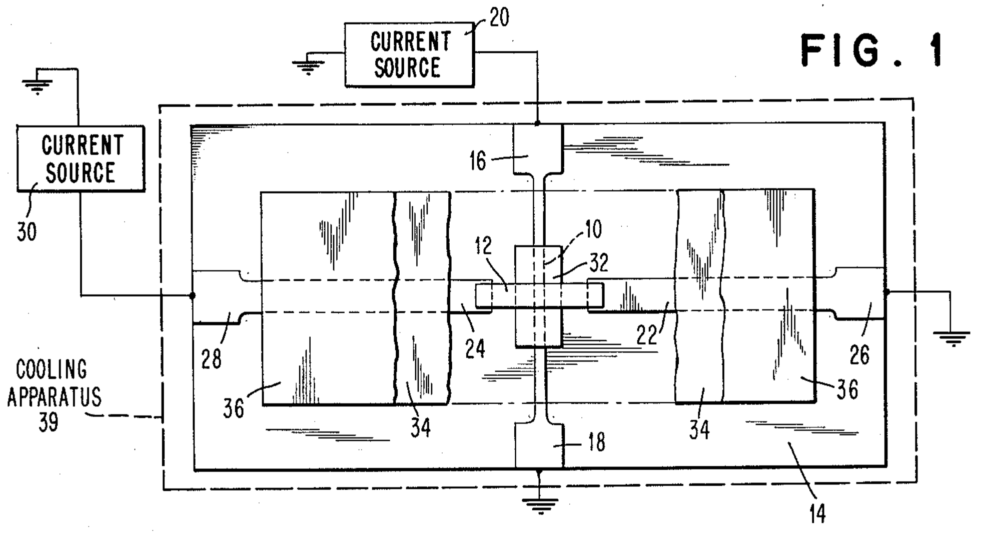
FIG. 1 is a partly schematic showing of a thin film cryotron circuit.

FIG. 1 is a partly schematic showing of a thin film cryotron of the type which is preferably used in practicing the principles of the present invention. The basic elements of the cryotron are a control conductor 10 and a gate conductor 12 which is traversed by the control conductor. Both of these conductors are in the form of thin films laid down, for example, by vacuum metalization, on a planar substrate 14. Control conductor 10 is fabricated completely of lead and extends between a pair of terminals 16 and 18 which are connected to the terminals of a current source 20. Gate conductor 12 is fabricated of tin and is connected by conductors 22 and 24, which are fabricated of lead, to terminals 26 and 28. These terminals are, in turn, connected to the terminals of a current source 30. The gate and control conductors 10 and 12 are insulated from each other by a layer of insulating material 32. A further layer of insulating material 34 is laid down on top of the conductors forming the circuit and finally a layer of hard superconductor material 36 is mounted on top of this layer of material. Portions of layers 34 and 36 are broken away in FIG. 1 to provide a clearer showing of the construction. Layer 36 serves as a magnetic shield which reduces the inductance of the circuit. The advantages of this type of construction are discussed in more detail in copending application Serial No. 625,512, filed November 30, 1956, in behalf of R. L. Garwin and assigned to the assignee of the subject application. The shielding layer 36 may be entirely insulated from the conductors forming the circuit or may be connected to these conductors to form distinct current return paths for current applied to the conductors. The details of this latter type of construction are shown and described in copending application Serial No. 809,815, filed April 29, 1959, in behalf of J. J. Lentz, now Patent No. 2,966,647.

In operation, the cryotron switching device of FIG. 1 is maintained at a temperature below that at which the material of which the gate is fabricated, here tin, undergoes a transition between superconductive and normal states in the absence of a magnetic field. The cooling apparatus is represented by the dotted box 39 and may be in the form of a Dewar of liquid helium whose pressure is controlled to obtain the proper operating temperature. Cooling devices of this type are usually termed cryostats. Since the remainder of the circuit is fabricated of lead, which has a much higher critical temperature than the tin gate, the control conductor 10 and connecting leads remain in a superconductive state under all conditions of circuit operation. The tin gate 12 is selectively switched from a superconductive to a normal state by magnetic fields applied to the gate when current is supplied to the control conductor 10 by source 20. The gate circuit, therefore, either exhibits zero electrical resistance or a finite electrical resistance according to the current carrying state of the control conductor.

Cryotron switching circuits of the type shown in FIG. 1 are generally connected with their gates in parallel across a current source with the division of current from the source between the parallel connected gates being controllable by signals applied to the control conductors for the gates. In order that one such circuit of parallel connected gates be capable of directly controlling the gates of a similar circuit, it is necessary that the devices exhibit gain greater than unity; more specifically, it is necessary that the characteristics of the devices be such that the current required in the control conductor to control the state of the gate be less than the operating current carried by the gate. The gain of cryotron type devices is usually expressed as follows:

$$\text{Gain}=\frac{I_{go}}{I_{co}}$$

where $I_{go}$=the self current required in the gate to cause the gate conductor to be driven resistive at the operating temperature in the absence of current in the control conductor; and $I_{co}$=the current required in the control conductor to cause the gate conductor to be driven resistive at the operating temperature in the absence of current in the gate conductor.

Figure 2:
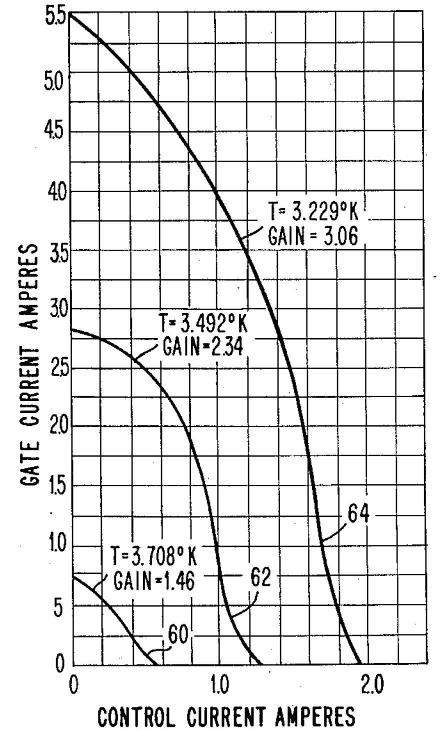
FIGS. 2 and 3 are curves depicting gain characteristics at different operating temperatures for two illustrative thin film cryotrons.
Figure 3:
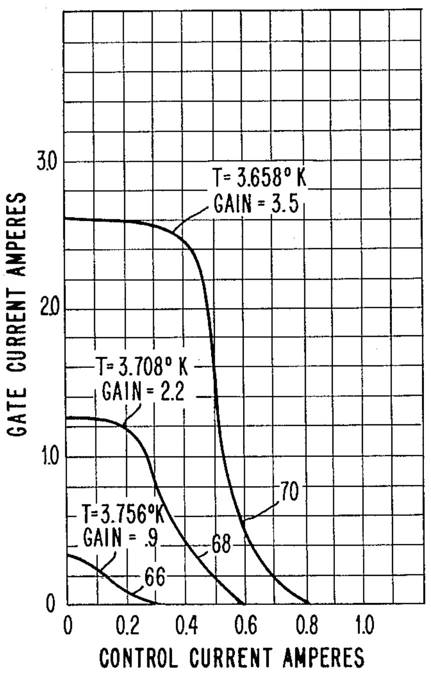

Since the fields produced by currents in the gate and control conductors are in quadrature, the critical control current required to drive the gate resistive varies with the current in the gate. The gain characteristics of cryotrons are, therefore, as indicated in FIGS. 2 and 3 roughly elliptical, with the intercept of each such curve with the ordinate, along which the gate current is plotted being the value $I_{go}$, and the intercept with the abscissa along which the control current is plotted being the value $I_{co}$.

In what are here termed bulk cryotron switching devices, which usually comprise a gate conductor in the form of a section of superconductive wire, around which is wound a control conductor in the form of a coil, gain is achieved since a unit of current in the coil produces a more intense magnetic field in the vicinity of the gate than does a self current of the same magnitude in the gate. In thin film type cryotrons, gain may be achieved as shown in the above cited copending application Serial No. 625,512, by fabricating the device so that the gate conductor film is wider than the control film at the point at which these films cross each other. Other arrangements for providing gain in thin film cryotrons are also available as shown, for example, in copending application Serial No. 761,085, filed September 15, 1958, in behalf of R.L. Garwin and assigned to the assignee of the subject application.

Thin film type cryotron switching devices have a number of advantages over their bulk counterparts, a most significant one of which is their higher gate resistance which allows much higher circuit operating speeds. Further, thin film type cryotrons, particularly of the planar configuration, may be laid down by vacuum metalization, for example, using mass production type techniques such as have been heretofore practiced in manufacturing printed circuits. Since the planar films form both the circuits and the devices, entire functional circuits and groups of circuits may be fabricated by laying down on a single planar substrate a plurality of layers of superconductor film conductors.

Figure 4:
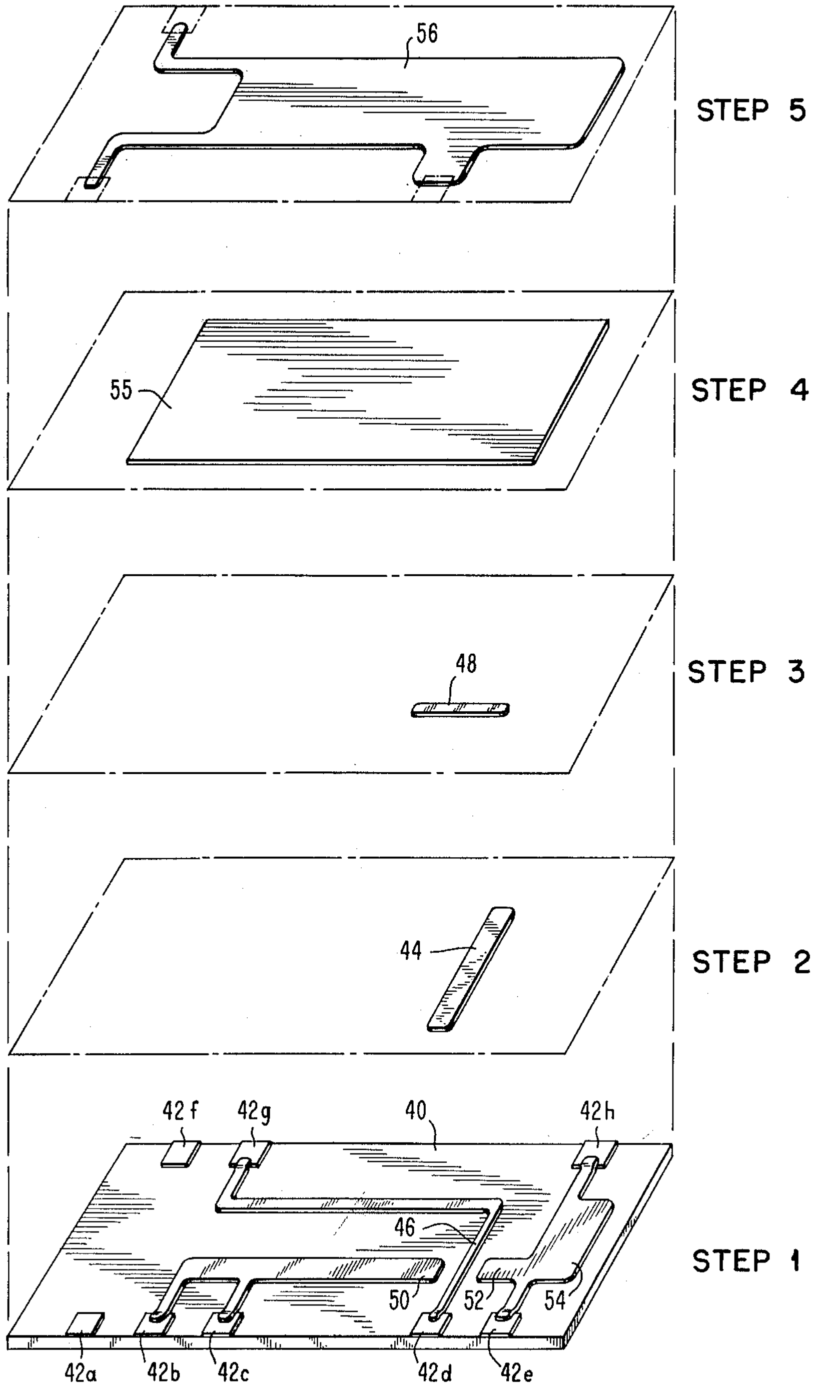
FIG. 4 illustrates the manner in which a cryotron together with connections for obtaining data on its operating characteristics may be evaporated on a planar substrate.

FIG. 4 illustrates the manner in which thin film cryotrons may be fabricated together with the necessary connections for obtaining data on their operating characteristics such as are shown in the curves disclosed in this application. First, a substrate 40 is provided with a number of terminals *42a* through *42h*. These terminals need not be superconductive and, in this illustrative embodiment, these terminals are actually silver which is painted on substrate 40. During the first evaporation step, Step 1, a pattern of lead conductors is laid down, as shown, on the substrate 40 making connections with certain of the silver terminals. During Step 2, a layer of insulating material 44, here silicon monoxide, is laid down on top of the previously deposited lead conductor 46. This conductor actually forms the control conductor of the cryotron being fabricated. Step 3 consists of evaporating a layer of tin 48 which traverses the control conductor 46 and is connected to lead segments 50 and 52 which were laid down during Step 1. This layer of tin 48 forms the gate conductor of the cryotron and is insulated from control conductor 46 by the previously deposited insulating layer 44. In order to avoid undue concentration of current in the tin gate at the points of connection to the lead, gate 48 is made somewhat narrower than lead segments 50 and 52. During Step 4, a further layer of silicon monoxide 55 is laid down to cover the previously deposited lead and tin conductors. This layer of insulating material, however, does not cover the outer edges of the circuit pattern laid down on substrate 40 including the silver terminals 42 and the ends of the evaporated conductors which extend to these terminals, as well as the outer portion of the lead pattern designated 54 located at the right hand edge of substrate 40. The final step in the process is to evaporate a further layer of lead 56 which forms the shield for the circuit. This shield as shown, is evaporated to connect to terminals *42a 42f*, control conductor 46 at terminal *42d*, and the portion of the lead pattern 54 which is in turn connected to terminals *42e* and *42h*.

The circuit of FIG. 4 may be tested to obtain its gain characteristics with the shield unconnected to the circuit conductors as follows. The terminals of the gate current source, corresponding to source 30 of FIG. 1, are connected to terminals *42b* and *42e*, between which the gate conductor 48 is connected; the terminals for the current source for control conductor 46, which source corresponds to source 20 of FIG. 1 are connected to terminals *42g* and *42d*; finally, the voltage probes for determining when gate 48 is driven resistive are connected at terminals *42c* and *42h*. When it is desired to obtain test data for the device with the control and gate conductors connected to the shield, the gate conductor current source is connected between terminals *42b* and *42a*, there being no connection made to terminal *42d*; the control conductor current source is connected between terminals *42g* and *42f*, there being no connection made at terminal *42e*; and the voltage as above, are connected to terminals *42c* and *42h*. The gain characteristics of the cryotron are essentially the same for both types of connection, the principal advantage of connecting the circuit conductors to the shield, as is described in detail in the above cited copending application Serial No. 809,815, now Patent No. 2,966,647, being to provide distinct current return paths in the shield for circuit current.

Cryotron type devices, both of the thin film and bulk type, have been operated at temperatures as close as possible to the critical transition temperatures for the gate material; the operating temperatures in all cases being higher than 94% of the critical temperature of the gate material. Thus, for example, wire wound switching devices having a tantalum gate and a niobium control have been operated at 4.2° K. which is the boiling temperature of liquid helium at atmospheric pressure. Since the critical transition temperature for tantalum is 4.4° K., this operating temperature is 95.5% of the critical temperature for the gate. Similarly, thin film type cryotrons which have generally been fabricated of tin gates and lead controls have usually been operated at temperatures very close to the transition temperatures for the tin gates. The transition temperatures for tin gates vary slightly, according to the manner of fabrication, from the critical temperature for the bulk material which is usually given at 3.72° K. In the past the operating temperature for tin gates in such cryotrons has always been less than $\frac{2}{10}$ of a degree below the operating temperature for tin. Thus, for a tin gate having a transition temperature 3.8° K., the operating temperature has always been 3.6° K. or higher, that is higher than 94% of the critical transition temperature. In fact, most tin gate thin film cryotrons have, in the past, been operated at a temperature less than $\frac{1}{10}$ of a degree below the transition temperature for the cryotron gate. The reason for choosing operating temperatures as close as possible to the critical temperature for the gate is that the critical field required to be applied by the control conductor increases as the temperature of the gate is decreased. Thus, in the past, no attempts have been made to operate cryotron circuits at temperatures far removed from the critical gate temperature since this would result in an increase both in the control and gate current requirements of the circuit and amount of heat which it dissipates.

This philosophy of operating cryotron devices at operating temperatures as close as possible to the transition temperature has proved sound for devices fabricated of bulk material, such as wire wound cryotrons. However, as will become apparent from the description of the results obtained by applicant, this philosophy is not sound in many applications wherein thin film devices are employed. By thin film devices, it is meant devices in which the thickness of the gate is of the same order of magnitude as the penetration depth for the material of which it is fabricated in the vicinity of the critical transition temperature for this material so as to exhibit size dependent properties. The penetration depth for a superconductor material is a measure of the depth to which a magnetic field penetrates the material. A detailed discussion of this characteristic of the superconductive state may be found in chapter V of the work by D. Shoenberg entitled "Superconductivity" which was published in 1952 by the Syndics of the Cambridge University Press. The penetration depths for different superconductor materials are usually specified with reference to their penetration depth at 0° K. which is designated $\lambda_0$ and which, for tin, is about 510 angstroms. The penetration depth for superconductive material increases as the temperature of the material is increased, and the relationship between penetration depth and temperature may be set forth as follows:

$$(\lambda/\lambda_0)^2 = 1/(1-(T/T_c)^4)$$

where $\lambda$=the penetration depth at a particular temperature;
$\lambda_0$=the penetration depth at 0° K.;
$T$=the particular temperature; and
$T_c$=the critical temperature for the material.

FIG. 7 is a plot which indicates the manner in which the penetration depth for a tin sample having a critical temperature $T_c$ of 3.82° K. varies with the temperature. From the above equation it is apparent that the general shape of the curve is the same for all superconductor materials with the penetration depth rising sharply as the critical temperature is approached.

Figure 9:
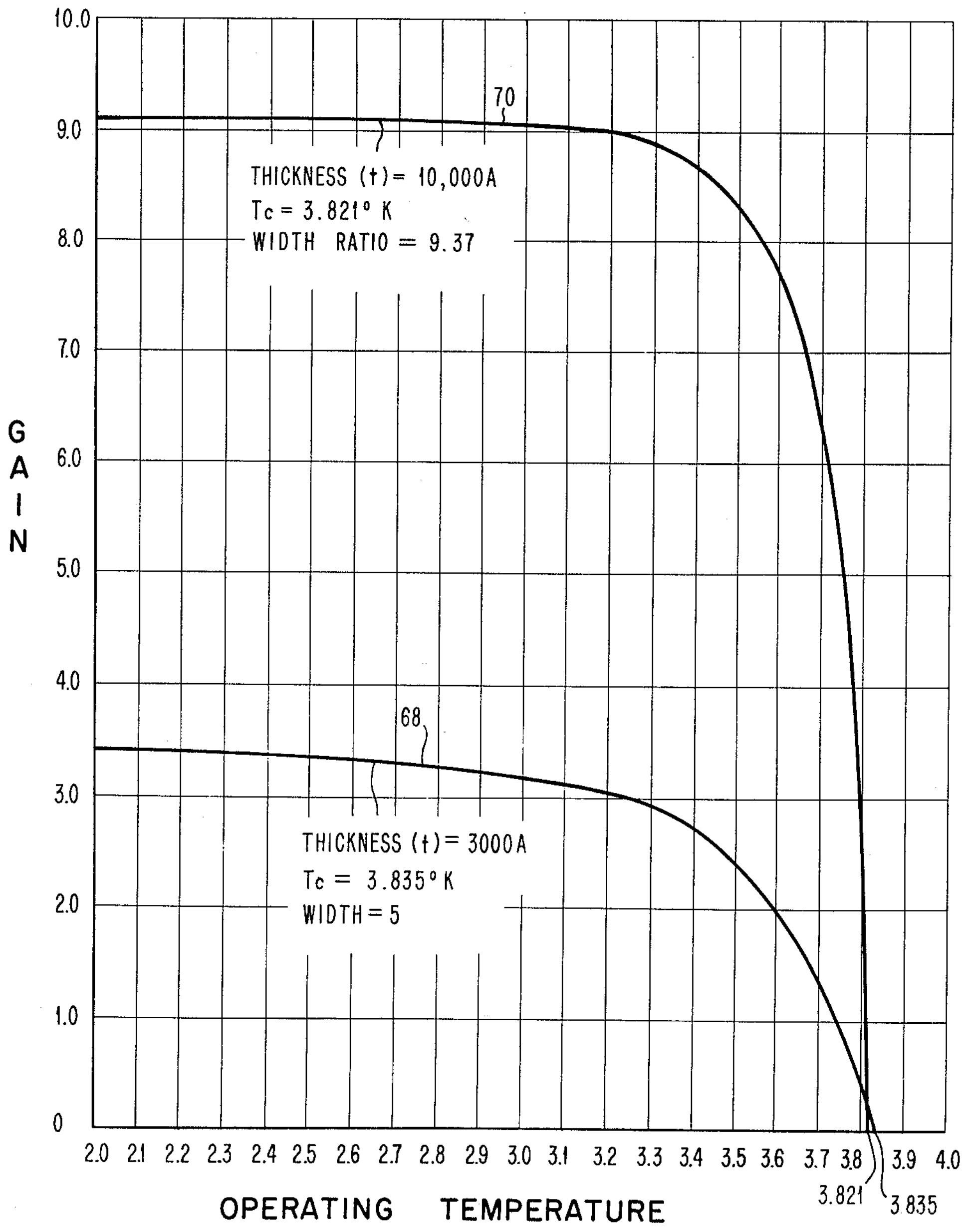
FIG. 9 is a plot showing the relationship between gain and temperature for two illustrative thin film cryotrons.

Because of this temperature dependence of the penetration depth, the gain for cryotrons having a gate conductor whose thickness is the same order of magnitude as the penetration depth is also sharply temperature dependent. This is illustrated in FIGS. 2, 3 and 9. FIG. 2 shows the gain curves for a thin film cryotron at three different operating temperatures. The gate of the cryotron, whose characteristics are plotted in this curve, was 3000 angstroms thick and had a critical transition temperature of 3.835° K. The width ratio for this cryotron, that is the ratio of the gate conductor width to the control conductor width was about five, which is the theoretical gain of the device. The gain for the three operating temperatures, designated T, as well as the ratio of the operating temperature to the critical temperatures of the material are shown below in tabular form.

| Curve | Operating temperature (T), °K. | Gain | T/Tc |
|---|---|---|---|
| 60 | 3.708 | 1.46 | .965 |
| 62 | 3.492 | 2.34 | .910 |
| 64 | 3.229 | 3.06 | .855 |

FIG. 3 shows a similar plot for a cryotron having a gate thickness of 3700 angstroms, a critical transition temperature of 3.825° K. and a width ratio of approximately 20. Data for this cryotron is set forth in tabular form below.

| Curve | Operating temperature (T), °K. | Gain | T/Tc |
|---|---|---|---|
| 66 | 3.756 | 0.9 | .980 |
| 68 | 3.708 | 2.2 | .970 |
| 70 | 3.658 | 3.5 | .955 |

These curves clearly illustrate the temperature dependence of the gain of cryotrons whose gate thickness is of the same order of magnitude as the penetration depth of the gate material in the vicinity of its critical transition temperature. The relationship is illustrated more completely in FIG. 9, wherein the actual gain $I_{go}/I_{co}$ for two cryotrons is plotted against operating temperature. The lower curve 68 of FIG. 9 shows the gain-temperature relationship for the same cryotron whose gain characteristics are depicted in the plot of FIG. 2. The upper curve 70 of FIG. 9 is for a cryotron having a gate thickness of 10,000 angstroms, a critical temperature of 3.821° K. and a width ratio of about 9.37.

The curves of FIGS. 2, 3 and 9 indicate a number of important characteristicts of thin film cryotrons among which the following are most significant. The gain of a thin film cryotron is temperature dependent and changes very sharply with changes in temperature just below the transition temperature of the cryotron gate. The gain curve for thin film cryotrons follows (in reverse form) the curve depicting the change in penetration depth with temperature (see FIG. 7), since the gain of a thin film cryotron is dependent upon the ratio of the thickness of the cryotron gate to the penetration depth of the material, which ratio may be expressed as $t/\lambda$; where $t$=the thickness of the gate; and $\lambda$=the penetration depth of the gate material at the operating temperature.

Thus, the gain of a thin film cryotron increases as the penetration depth of the gate material decreases. When the temperature of the gate is lowered sufficiently so that there is no longer any appreciable change in its penetration depth with decreasing temperature, the gain of the cryotron remains essentially constant with decreasing temperature.

Since the gain for thin film cryotrons is the ratio $I_{go}/I_{co}$, it necessarily follows that, as the operating temperature of the cryotron is lowered and the penetration depth $\lambda$ is decreased, the increase in the magnitude of the critical current for the control conductor ($I_{co}$) as the temperature is lowered is less than the increase in the magnitude of the critical self current $I_{go}$. More succinctly stated, $I_{go}$ increases faster than $I_{co}$ as the temperature of the thin film cryotron is lowered. An explanation of this phenomenon and also of why it is not observed for bulk type samples may be had from a consideration of FIGS. 5, 6 and 8.

Figure 8:
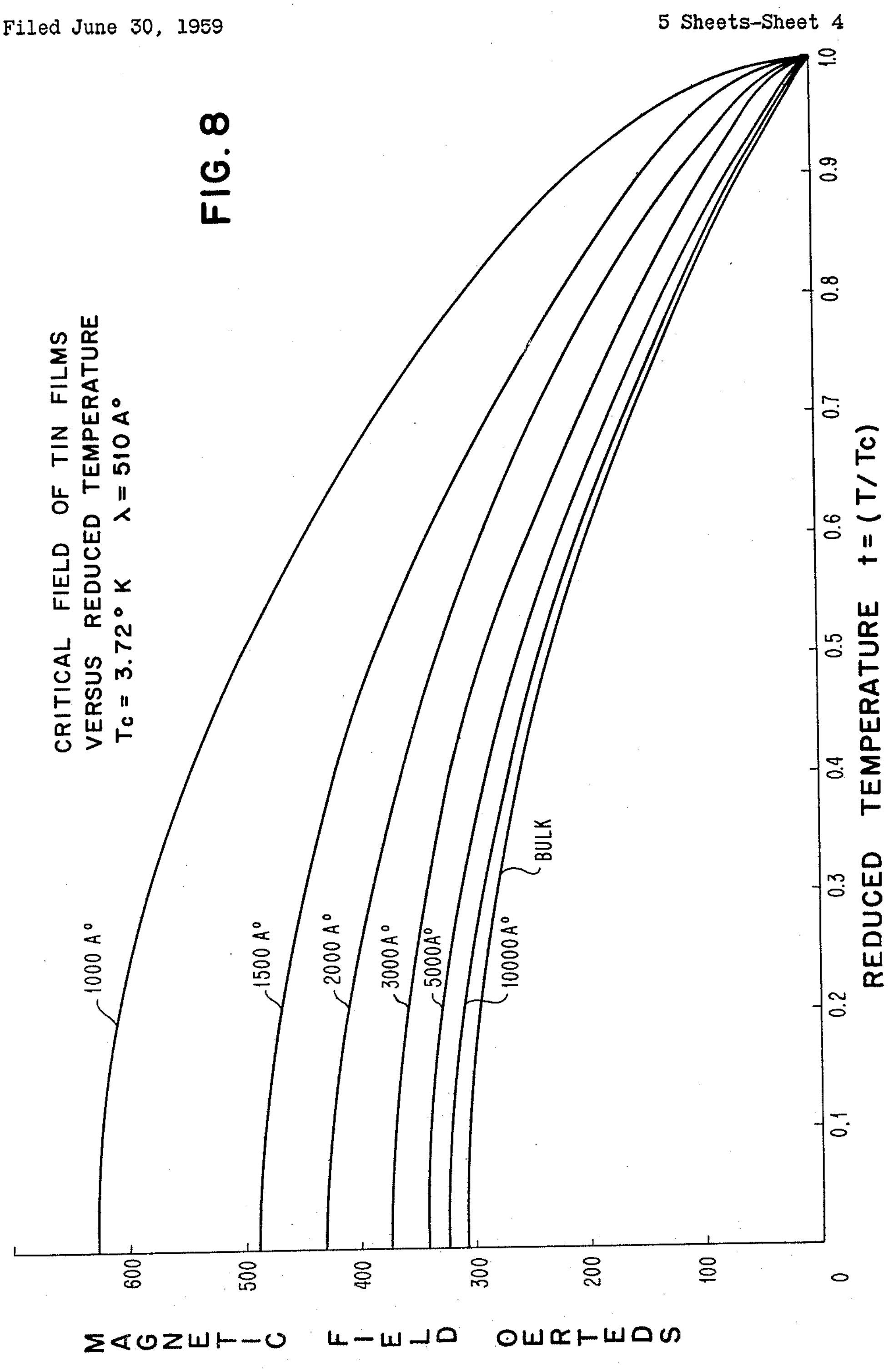
FIG. 8 shows a family of curves depicting the external field required to drive tin conductors of different thicknesses from a superconductive to a resistive state at different operating temperatures.

FIG. 8 shows the manner in which the critical field for thin films of different thicknesses varies with decreasing temperature. Curves depicting the same relationship for other superconductor materials such as lead, indium and mercury may be found in the above cited work by Schoenberg. These curves show that, at any given temperature, the critical field required to drive a thin film specimen resistive increases as the thickness of the specimen decreases. For bulk specimens, that is specimens for which $t >>> \lambda$, the critical field is essentially independent of thickness. Curve 70 of FIG. 5 indicates the manner in which an externally applied field is believed to penetrate such a bulk specimen. As predicted by the London Theory (see Superfluids, vol. 1, by Fritz London, published by John Wiley and Sons, Inc., 1950), the penetration of a magnetic field $H_0$ into, for example, a bulk specimen of superconductor material decays exponentially in accordance with the expression $H=H_0e^{-x/\lambda}$ where "H" is magnetic field intensity at a depth "$x$" within the specimen and $\lambda$ is the penetration depth for the bulk specimen material at a particular operating temperature. In the London theory, penetration depth is defined as that depth within a bulk specimen whereat an external magnetic field "$H_0$" decays to $1/e$ of its value at a particular operating temperature. However, the magnetic field distributing within a superconductor specimen satisfies the expression $$H=H_0\left(\frac{e^{+x/\lambda}+e^{-x/\lambda}}{e^{+a/\lambda}+e^{-a/\lambda}}\right)$$

where the quantity "$a$" is equal to one-half the thickness "$t$" of the specimen. With respect to thin film specimens, therefore, penetrating magnetic fields do not approach zero as is the case with bulk specimens. As shown in curve 70 of FIG. 5, the magnetic field distribution within a bulk specimen is essentially constant in all but thin exterior portions of the specimen; pronounced variations in the field distribution occur to a depth which is only slightly greater than the penetration depth. When the thickness of the specimen is very large compared to the penetration depth, therefore, changes in thickness of the material affect little or no change in the magnetic field distribution within the specimen. However, when the thickness "$t$" of the specimen is less than twice the penetration depth, i.e. a thin film, magnetic field distribution is much more uniform throughout such specimen as indicated in curve 72 of FIG. 6. If the thickness of the thin film specimen were further decreased, the field distribution would be more uniform and, if the thickness were increased, the field distribution would be less uniform.

Curve 74 of FIG. 5 shows what is believed to be the field distribution for current carried by the gate itself where the thickness of the gate is much greater than its penetration depth, whereas curve 76 of FIG. 6 illustrates the distribution for a film having a thickness of less than twice the penetration depth. From these curves it is apparent that changes in thickness or penetration depth have little effect on the overall field distribution produced by current in the gate itself in a gate for which $t$ is much greater than $\lambda$. However, a significant effect is produced by such changes when $t$ and $\lambda$ are of the same order of magnitude. Further, the field distribution is not the same for externally applied fields as for fields produced by the current in the gate film itself, since in the latter case, the field is in one direction adjacent one edge of the film and in the opposite direction adjacent the other edge of the film. It is for this reason that the values $I_{co}$ and $I_{go}$ for a thin film cryotron do not change at the same rate as the penetration depth of the gate is decreased by lowering the operating temperature.

One important thing to note concerning these curves is that the effect is still marked for films which are somewhat thicker than twice the penetration depth at the operating temperature. This is shown by the curve for the 10,000 angstrom film in FIG. 8, and more importantly, by the gain curve of FIG. 9 for the cryotron having a gate thickness of 10,000 angstroms. It is further illustrated by the fact that the highest gain achieved for the cryotron having a gate thickness of 3000 angstroms is less than 3.5, whereas, the theoretical gain for this cryotron predicted upon the ratio of its gate conductor width to its control conductor width is five. Since the penetration depths for various materials, though they differ according to the experimental method of measurement, and also vary according to the amount of impurities present, are all of the same order of magnitude, that is, in the order of 1000 angstroms or less, the thickness effect described has little significance for films substantially thicker than 10,000 angstroms. Further, cryotrons of the type to which this invention is principally directed are those having a gate thickness not substantially greater than 10,000 angstroms. Therefore, bulk type devices, for example, of the wire wound type, having a gate diameter in the order of .001 inch (254,000 angstroms) are not considered to be thin film devices since the gain for a bulk type device is not sensitive to temperature changes, except possibly, within a few one-hundredths of a degree of the transition temperature of its gate and, therefore, these devices are advantageously operated as close to this temperature as possible.

Particular note should be made of the fact that where, as in the preferred embodiments herein disclosed, the cryotron control conductor is fabricated of a relatively "hard" superconductor material such as lead, which has a critical transition temperature of about 7.2° K., the penetration depth for the lead is essentially unchanged for changes in operating temperatures near and below the transition temperature for the tin gate. Therefore, the overall current distribution for the lead control conductors and, therefore, the magnetic field produced thereby, remains essentially the same as the operating temperature is lowered away from the critical transition temperature for the tin gate.

The advantages attendant the operation of thin film cryotrons at temperatures appreciably less than the transition material for the gate material become apparent from a consideration of the curves of FIG. 9. By operating such cryotrons at temperatures less than 94% of the critical temperature for the gates, improved gain characteristics are achieved. Thus, for cryotrons having a tin gate exhibiting a transition temperature of 3.82° K., distinct advantages in gain are achieved by operating the cryotron at a temperature less than 3.6° K. or less. Further, not only does the gain become higher at lower temperatures, but it is less temperature sensitive, thereby making less critical the temperature control of the environment in which the cryotron is operated. In large scale computers utilizing many thousands of such cryotrons operated at extremely high speeds and repetition rates, thermal control is, of course, a major problem. In many such applications it is, therefore, preferable to operate the cryotrons on the smooth portion of their gain curves, that is, below 85% of the critical temperatures for the gate, which for the tin gate cryotrons of FIG. 9 is 3.25° K. As is evident from the plot of FIG. 7, $(\lambda/\lambda_0)^2=1/(1-(T/T_c)^4)$; the penetration depth changes only slightly for changes in operating temperature below 70% of the critical transition temperature. For the gates whose characteristics are depicted in FIG. 9, this represents an operating temperature of 2.7° K. If the operating temperature is lowered much below this point, little improvement in gain is achieved even for extremely thin gates and both the gate and control conductor current requirements of the circuit are raised and the heat dissipation problem increased. It is, therefore, preferable in many applications to operate the circuits at a temperature no lower than is required to achieve the gain and temperature insensitivity required. A further reason for this is that lower temperatures usually require higher operating currents and as the operating current carried by the cryotron gates is increased, there is an increase in the possibility that the gates will burn due to $I^2R$ heating when driven resistive when carrying this high operating current. In order to further guard against this possibility it is advisable, especially when using very thin films, which are operated at temperatures well below the transition temperature and which carry a relatively high operating current, to provide a means for swiftly shifting the current out of the gate when it is driven resistive.

While the invention has been particularly shown and described with reference to preferred embodiments thereof, it will be understood by those skilled in the art that various changes in form and details may be made therein without departing from the spirit and scope of the invention.

What is claimed is:

1. In a thin film cryotron circuit of the type including a thin film gate conductor of superconductor material and a thin film control conductor arranged adjacent said gate conductor, said gate conductor being of a thickness to exhibit size dependent properties, and means for supplying current to said gate conductor to be gated under the control of current supplied to said control conductor; the improvement comprising operating said circuit at an operating temperature which is not greater than 94% of the critical transition temperature whereat said superconductor material forming said gate conductor undergoes a transition between superconductive and normal states in the absence of a magnetic field.

2. The circuit of claim 1 wherein said operating temperature is not less than 70% of said critical transition temperature.

3. In a thin film cryotron circuit of the type including a thin film gate conductor of superconductor material and a thin film control conductor arranged adjacent said gate conductor, said gate conductor being of a thickness to exhibit size dependent properties, and means for supplying current to said gate conductor to be gated under the control of current supplied to said control conductor; the improvement comprising operating said circuit at an operating temperature which is not greater than 85% of the critical transition temperature whereat said superconductive material forming said gate conductor undergoes a transition between superconductive and normal states in the absence of a magnetic field.

4. In a superconductor circuit; a superconductor gating device comprising a gate conductor of superconductor material and a control conductor of superconductor material arranged in magnetic field applying relationship to said gate conductor; said gate and control conductors being in the form of thin films laid down on a planar substrate; the thickness of said gate conductor being not substantially greater than 10,000 angstroms; and means for maintaining said gating device at an operating temperature less than 94% of the critical transition temperature whereat said superconductor material forming said gate conductor undergoes a transition between superconductive and normal states in the absence of a magnetic field.

5. In a superconductor circuit; a superconductor gating device comprising a gate conductor of superconductor material and a control conductor of superconductor material arranged in magnetic field applying relationship to said gate conductor; the thickness of said gate conductor being of the same order of magnitude as the penetration depth of the material of which it is fabricated at temperatures immediately below the critical transition temperature of said gate conductor material, said critical transition temperature being defined as that temperature whereat said gate conductor material undergoes a transition between superconductive and normal states in the absence of a magnetic field; means for supplying control current to said control conductor and gate current to said gate conductor; and means for maintaining said gating device at an operating temperature not greater than 94% of said critical transition temperature of said gate conductor material.

6. In a superconductor circuit; a superconductor gating device comprising a gate conductor of superconductor material and a control conductor of superconductor material arranged in magnetic field applying relationship to said gate conductor; said gate and control conductors being in the form of thin films deposited on a planar substrate; the thickness of said gate conductor being of the same order of magnitude as the penetration depth of the material of which it is fabricated at temperatures immediately below the critical transition temperature whereat said gate conductor material undergoes a transition between superconductive and normal states in the absence of a magnetic field; means for supplying control current to said control conductor and gate current to said gate conductor; and means for maintaining said device at an operating temperature not greater than 85% of said critical transition temperature.

7. The circuit of claim 6 wherein the thickness of said gate conductor is not substantially greater than 10,000 angstroms.

8. The circuit of claim 6 wherein said gate conductor is fabricated of tin and said control conductor is fabricated of lead and the thickness of said tin gate conductor is not substantially greater than 10,000 angstroms.

9. In a superconductor circuit; a superconductor gating device comprising a tin gate conductor and a lead control conductor arranged in magnetic field applying relationship to said tin gate conductor; said gate and control conductors being in the form of thin films deposited on a planar substrate with the control conductor traversing the gate conductor; means supplying control current to said lead control conductor and gate current to said tin gate conductor; the thickness of said tin gate conductor being not substantially greater than 10,000 angstroms; and means maintaining said gating device at an operating temperature which is not greater than 94% of the critical temperature whereat said tin gate conductor undergoes a transition between superconductive and normal states in the absence of a magnetic field.

10. In a superconductor circuit; a superconductor gating device comprising; a planar thin film gate conductor of superconductive material of a thickness to exhibit size dependent properties and having a critical transition temperature at which it undergoes a transition from a normal to a superconductive state in the absence of a magnetic field; and a planar thin film control conductor traversing said gate conductor for controlling the state of said gate conductor; and means maintaining said device at an operating temperature between 70% and 85% of said critical transition temperature of said gate conductor.

11. The circuit of claim 10 wherein said gate conductor is fabricated of tin and said means maintains said device at an operating temperature between 2.7° K. and 3.25° K.

12. The circuit of claim 10 wherein the thickness of said gate conductor is between zero and about 10,000 angstroms.

13. The circuit of claim 12 wherein the thickness of said gate conductor is about 3,000 angstroms.

14. In a superconductor circuit; a gate conductor of superconductor material and a control conductor of superconductor material; said gate and control conductors being in the form of thin films laid down on a planar substrate with the control conductor traversing the gate conductor; the width of said gate conductor being greater than the width of said control conductor; current supply means for supplying control current to said control conductor and gate current to said gate conductor; the thickness of said gate conductor being not substantially greater than 10,000 angstroms; and means for maintaining said gate conductor at an operating temperature not greater than 94% of the critical transition temperature whereat said superconductor material forming said gate conductor undergoes a transition between superconductive and normal states in the absence of a magnetic field whereby said circuit exhibits relatively higher gain and more temperature stability than when operated at a temperature greater than 94% of said critical transition temperature.

15. In a superconductor circuit, a superconductor gate device comprising a gate conductor and a control conductor formed of thin films of different superconductive materials laid down on a planar substrate, said control conductor being arranged in magnetic field applying relationship to said gate conductor, the thickness of said gate conductor being not substantially greater than 10,000 angstroms, and means for maintaining said gate device at an operating temperature between 85% and 94% of the critical transition temperature whereat said gate conductor material first exhibits superconductor properties in the absence of a magnetic field.

16. In a superconductor circuit, a superconductor gating device comprising a gate conductor and a control conductor formed of thin films of different superconductor materials laid down on a planar substrate, said gate conductor being of a thickness to exhibit size dependent properties, said control conductor being arranged in magnetic field applying relationship to said gate conductor, means for supplying current to said gate conductor to be gated under the control of current supplied to said control conductor, and means for maintaining said gating device at an operating temperature between 85% and 90% of the critical transition temperature whereat said gate conductor material undergoes a transition between superconductive and normal states in the absence of a magnetic field.

17. In a superconductor circuit, a thin film of superconductor material having a characteristic critical temperature $T_c$ whereat transitions between superconductive and normal states occur in the absence of an external magnetic field, said thin film having a thickness of a same order of magnitude as the penetration depth $\lambda$ of said superconductor material, penetration depth $\lambda$ being substantially defined as equal to $\lambda_0/\sqrt{1-(T/T_c)^4}$ whereat $\lambda_0$ is the characteristic penetration depth of said superconductor material at 0° K. and T is a particular operating temperature, means arranged in magnetic field applying relationship to said thin film for controlling the state of said thin film, and means for maintaining said operating temperature T not greater than 94% of said critical temperature $T_c$ whereby the operating characteristics of said superconductor circuit are relatively insensitive to temperature variations.

18. A superconductor circuit as defined in claim 17 wherein said maintaining means is operative to determine said operating temperature T not less than 70% of said critical transition temperature $T_c$.

19. A superconductor circuit comprising a gate conductor and a control conductor in magnetic field applying relationship therewith, said gate and said control conductors being formed of thin films of different superconductor materials, said gate conductor material having a critical transition temperature $T_c$ whereat transitions between normal and superconductive states occur in the absence of a magnetic field, said critical transition temperature of said gate conductor material being lower than that of said control conductor material, the thickness of said gate conductor being of a same order of magnitude as the penetration depth $\lambda$ whereat a magnetic field penetrating one surface of a bulk specimen of said superconductor material would decay to $1/e$ of its value at a temperature immediately below said transition temperature $T_c$, and means for determining the operating temperature T of said circuit not greater than 94% of said transition temperature $T_c$ to vary said penetration depth $\lambda$ in accordance with the expression $\lambda=\lambda_0/\sqrt{1-T/T_c)^4}$ where $\lambda_0$ is the characteristic penetration depth of said gate conductor material at 0° K. whereby the gain of said gate conductor is increased while its temperature sensitivity is decreased.

20. In a superconductor circuit; a superconductor gating device comprising a gate conductor of superconductor material and a control conductor of superconductor material; said gate and control conductors being in the form of thin films laid down on a planar substrate with the control conductor traversing the gate conductor; the width of said gate conductor being larger than the width of said control conductor, said gate conductor being of a thickness to exhibit size dependent properties and provide said superconductor device gain characteristics which are markedly temperature dependent in the range from 94% to 99% of the critical transition temperature whereat said superconductor material forming said gate conductor undergoes transitions between superconductive and normal states in the absence of a magnetic field, said gain characteristics of said superconductor circuit being substantially insensitive to temperature variations in the range of temperature below 94% of said critical transition temperature; and means maintaining said gating device at an operating temperature not greater than 94% of said critical transition temperature.

21. In a superconductor circuit; a superconductor gating device comprising a gate conductor of superconductor material and a control conductor of superconductor material arranged in magnetic field applying relationship to said gate conductor; said gate and control conductors being in the form of thin films deposited on a substrate, said gate conductor being of a thickness to exhibit size dependent properties and provide said superconductor device gain characteristics which are sharply temperature dependent in the range between 94% and 99% of the critical transition temperature of said gate conductor material and which are substantially insensitive to temperature variations in the range below 94% of said critical transition temperature, said critical transition temperature being defined as that temperature whereat said gate conductor material undergoes a transition between superconductive and normal states in the absence of a magnetic field; and means for maintaining said gating device at an operating temperature not greater than 94% of said critical transition temperature.

References Cited in the file of this patent

UNITED STATES PATENTS

| | | |
|---|---|---|
| 2,666,884 | Ericsson et al. | Jan. 19, 1954 |
| 2,832,897 | Buck | Apr. 29, 1958 |
| 2,914,735 | Young | Nov. 24, 1959 |

OTHER REFERENCES

Physical Review, vol. 71, page 471, 1947.

Buck: "A Magnetically Controlled Gating Element" (pages 47–50), December 1956.